(12) United States Patent
Gueron et al.

(10) Patent No.: US 8,407,425 B2
(45) Date of Patent: Mar. 26, 2013

(54) OBSCURING MEMORY ACCESS PATTERNS IN CONJUNCTION WITH DEADLOCK DETECTION OR AVOIDANCE

(75) Inventors: Shay Gueron, Haifa (IL); Gad Sheaffer, Haifa (IL); Shlomo Raikin, Geva Carmel (IL)

(73) Assignee: Intel Corporation, Santa Clara, CA (US)

( * ) Notice: Subject to any disclaimer, the term of this patent is extended or adjusted under 35 U.S.C. 154(b) by 645 days.

(21) Appl. No.: 11/966,794

(22) Filed: Dec. 28, 2007

(65) Prior Publication Data

US 2009/0172304 A1 Jul. 2, 2009

(51) Int. Cl.
*G06F 12/00* (2006.01)

(52) U.S. Cl. .................. 711/146; 711/156; 714/47.1

(58) Field of Classification Search .............. 710/48–50, 710/200–244; 711/141, 146–147, 150–152, 711/154, 156, 163; 714/39, 47, 704
See application file for complete search history.

(56) References Cited

U.S. PATENT DOCUMENTS

| | | | |
|---|---|---|---|
| 4,382,179 A * | 5/1983 | Penton | 377/20 |
| 5,442,758 A * | 8/1995 | Slingwine et al. | 717/147 |
| 7,849,465 B2 | 12/2010 | Zou et al. | |
| 7,882,339 B2 | 2/2011 | Jacobson et al. | |
| 2004/0068501 A1 * | 4/2004 | McGoveran | 707/8 |
| 2005/0071515 A1 * | 3/2005 | DeWitt et al. | 710/1 |
| 2005/0149697 A1 * | 7/2005 | Enright et al. | 712/214 |
| 2006/0026411 A1 * | 2/2006 | Yoshida | 712/241 |
| 2008/0133842 A1 | 6/2008 | Raikin et al. | |

OTHER PUBLICATIONS

Zeng, Fancong, "Just-In-Time and Just-In-Place Deadlock Resolution," May 2007, Graduate School—New Brunswick Electronic Theses and Dissertations.*

* cited by examiner

*Primary Examiner* — Jared Rutz
*Assistant Examiner* — Nicholas Simonetti
(74) *Attorney, Agent, or Firm* — Barnes & Thornburg LLP

(57) ABSTRACT

Methods, apparatus and systems for memory access obscuration are provided. A first embodiment provides memory access obscuration in conjunction with deadlock avoidance. Such embodiment utilizes processor features including an instruction to enable monitoring of specified cache lines and an instruction that sets a status bit responsive to any foreign access (e.g., write or eviction due to a read) to the specified lines. A second embodiment provides memory access obscuration in conjunction with deadlock detection. Such embodiment utilizes the monitoring feature, as well as handler registration. A user-level handler may be asynchronously invoked responsive to a foreign write to any of the specified lines. Invocation of the handler more frequently than expected indicates that a deadlock may have been encountered. In such case, a deadlock policy may be enforced. Other embodiments are also described and claimed.

13 Claims, 7 Drawing Sheets

OBSCURING MEMORY ACCESS PATTERNS IN CONJUNCTION WITH DEADLOCK DETECTION OR AVOIDANCE

BACKGROUND

1. Technical Field

The present disclosure relates generally to obscuring of memory access patterns.

2. Background Art

The access patterns of a program executing on a processor-based system, as the program accesses memory, may inadvertently reveal private or sensitive information of the program. For example, the access patterns of an application encoding or decoding a secret cryptographic key may in some cases be used to determine the value of the bits in the key. Other exploits that use this type of information leakage may be readily envisioned.

Software side channel attacks have the potential to compromise the security of some cryptographic applications. Such attacks may exploit the multitasking capabilities of modern operating systems and the implied sharing of hardware resources. That is, many such side-channel attacks exploit aspects of multi-threading environments where two concurrent threads share computing resources. One such shared resource may be a shared memory resources, such as a memory hierarchy that includes one or more shared caches.

In one specific instance, for example, if two threads (also interchangeably termed "processes" in the context of this Application) executing on a processor-based system share a cache, it is possible for one thread, a "spy" thread, to observe information about the access patterns of the other thread, a "target" thread. This is because the access patterns of the target thread can cause data of the spy thread to be evicted from cache memory, and can thus alter the access time of the spy thread's access of memory.

Depending on different processor architectures in processor-based systems, the spy thread may achieve this type of information leak detection either temporally or spatially. In the temporal case, the spy thread and the target thread may run on a single processor and be interleaved in execution, sharing the single processor's cache. In the spatial case, the spy thread and target thread may run on different processors of a multi-processor system, or on different cores of a multi-core processor, but the spy thread may still achieve this type of detection if the two processors or cores share a common cache.

BRIEF DESCRIPTION OF THE DRAWINGS

Embodiments of the present invention may be understood with reference to the following drawings in which like elements are indicated by like numbers. These drawings are not intended to be limiting but are instead provided to illustrate selected embodiments of systems, methods and mechanisms to provide memory access obscuration along with deadlock avoidance or detection.

DETAILED DESCRIPTION

The following discussion describes selected embodiments of methods, systems and mechanisms to protect against cache-access side channel attacks while detecting or avoiding deadlock situations. The apparatus, system and method embodiments described herein may be utilize with single core multi-threading systems as well as with multi-core systems that share a common cache.

In the following description, numerous specific details such as system configurations, particular order of operations for method processing, specific examples of heterogeneous and homogenous systems, and implementation details for processing features such as monitoring and loss-of-monitoring have been set forth to provide a more thorough understanding of embodiments of the present invention. It will be appreciated, however, by one skilled in the art that the invention may be practiced without such specific details, or with different implementations for such details. Additionally, some well-known structures, circuits, and the like have not been shown in detail to avoid unnecessarily obscuring the present invention.

Figure 1:
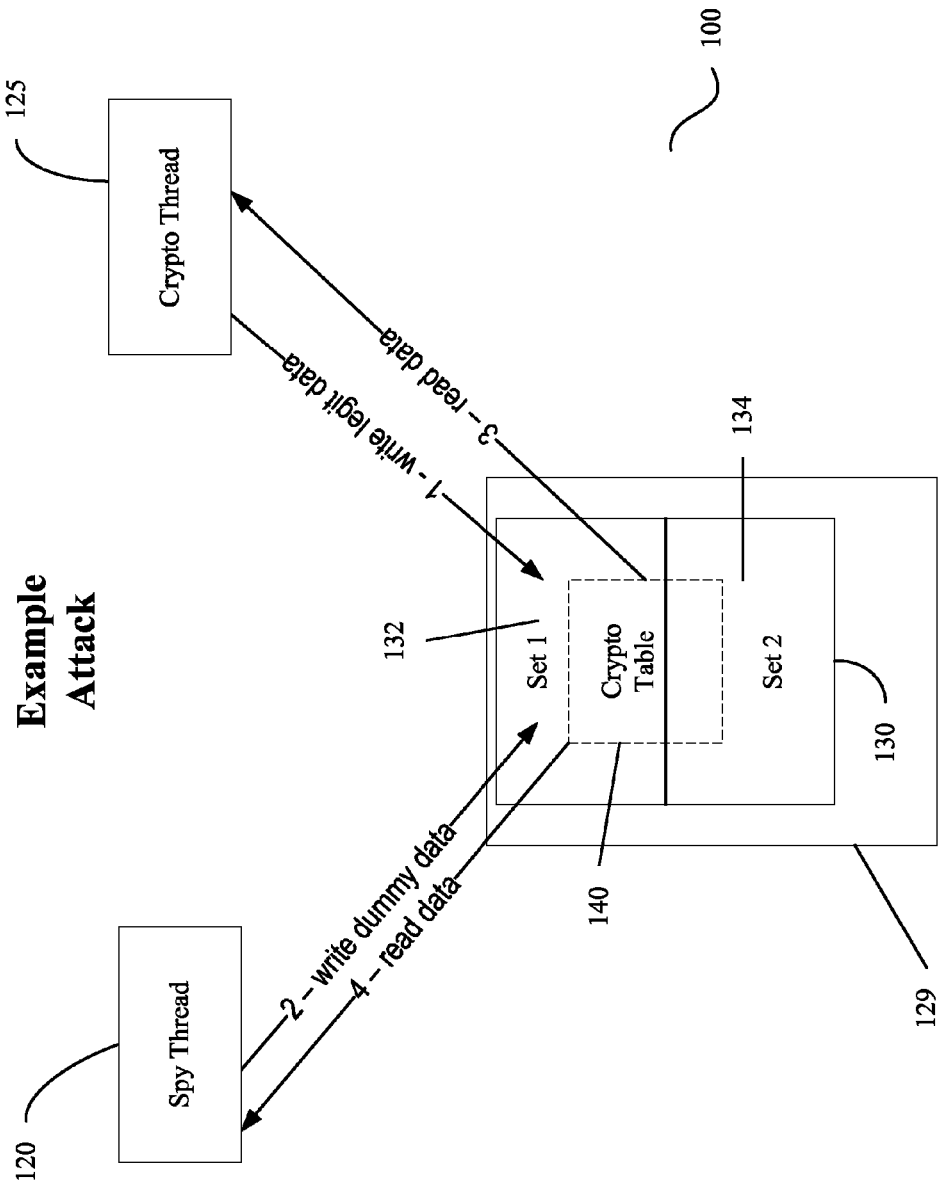
FIG. 1 is a block diagram illustrating at least one example embodiment of a strategy via which a spy thread may observe access patterns of another thread.

FIG. 1 illustrates at least one embodiment of a system 100 and sample strategy via which a spy thread may observe access patterns of another thread. Such strategy is sometimes referred to as a cache-based side-channel attack. FIG. 1 illustrates that a first (spy) thread 120 and a second (legitimate) thread 125 may run concurrently on a processing system 100. For at least one embodiment, the second thread 125 may run a cryptography application. Such cryptography application may implement, for example, AES (Advanced Encryption Standard) or RSA public-key encryption processing. (A thread running a cryptographic application may be hereinafter interchangeably referred to as "crypto", the legitimate thread, or the target thread).

FIG. 1 illustrates that the first and second threads 120, 125 share a memory resource 129. The shared memory resource may be a memory hierarchy that includes one or more caches 130.

For at least one embodiment, the threads 120, 125 may be concurrent threads that run on a single core and share the cache 130 and other resources. For one such approach, referred to as simultaneous multithreading ("SMT"), a single physical processor is made to appear as multiple logical processors to operating systems and user programs. For SMT, multiple software threads 120, 125 can be active and execute simultaneously on a single processor without switching. That is, each logical processor maintains a complete set of the architecture state, but many other resources of the physical processor, such as caches, execution units, branch predictors, control logic and buses are shared. For SMT, the instructions from multiple software threads thus execute concurrently, each logical on a distinct logical processor.

For at least one other embodiment, the first and second threads 120, 125 may run on separate cores within a multi-threading computing system, where the separate cores share a memory resource 129, which may be a memory hierarchy that includes one or more levels of cache 130.

For the example illustrated in FIG. 1, the crypto thread 125 uses a precomputed table 140, for its cryptography algorithm. For the embodiment illustrated in FIG. 1, the table 140 spans over two cache sets, Set 1 142 and Set 2 134. (Although only two sets 132, 134 are shown for simplicity, one of skill in the art will recognize that the shared cache 130 may include more sets).

During execution, the crypto thread 125 reads an entry from the table 140. Spy thread 120 may gain useful information for breaking the crypto thread's 125 cryptography algorithm if it can glean exactly which part of the table 140 is being accessed. This may reveal information about the secret key being used during the crypto thread's cryptography algorithm. To that end, one goal of the spy thread 120 is to discover exactly which entry of the table 140 is used by the crypto thread 125. However, the structure of the table 140, because it spans two sets 132, 134, does not easily support such fine granularity of information.

Thus, it may be a more realistic goal of the spy thread 120 to try to determine which one of the two cache sets 132, 134 is accessed by the crypto thread 125 during execution of the cryptography algorithm. FIG. 1 illustrates that, at a first operation, the crypto thread 125 loads data into the table 140. At a second operation 2, the spy thread 120 writes data (which may be arbitrary data) to the address of the table 140. By so doing, the spy thread 120 fills cache set S1 with its own data and causes eviction of the data that the crypto thread 125 cached during the first operation.

When the crypto thread 125 reads data from the table 140 at operation 3, it either reads a line from cache set S2 134 or from cache set S1 132. In the former case, if the crypto thread 125 reads the table data from set S2 134 at operation 3, the data originally written by the crypto thread (see operation 1) has not been evicted. The data originally written at operation 1 is still in the second set S2 134. In this case, the reading of the data by the crypto thread 125 does not affect (evict) the data that was loaded into the cache by the spy thread 120 (e.g., the arbitrary data written at operation 2 is not evicted).

However, if the crypto thread 125 reads the table data from set S1 132 at operation 3, then the crypto thread 125 experiences a cache miss. In response, some data must be evicted from the first set 132 of the cache 130 in order to make room for the data that needs to be pulled into the cache 130 in order to satisfy the read request from the crypto thread 125. Some cache lines from set S1 132 are evicted, evicting some of the spy thread's 120 dummy data and replacing it with table 140 data.

To capitalize on the eviction in order to learn information about the crypto thread's 125 cryptography data, the spy thread 120 may utilize read latencies. FIG. 1 illustrates that, at operation 4, the spy thread 120 executes an instruction to read its own data from Set 1 132. The spy thread 120 measures the read latency for this operation. For one embodiment, the spy thread 120 measures the read latency using a time stamp counter. A relatively long read latency indicates a cache miss. If spy thread 120 suffers a cache miss at operation 4, the spy thread 120 can conclude that the crypto thread 125 accessed Set 1 132 at operation 3. On the other hand, a short read latency at operation 4 allows the spy thread 120 to conclude that the crypto thread instead accessed Set 2 134 at operation 3.

Accordingly, the example attack set forth in FIG. 1 illustrates that the spy thread 120 may indirectly obtain information regarding which parts of data are used by the crypto thread 125 during its cryptography processing. Such information may compromise the security of certain cryptography applications.

Figure 2:
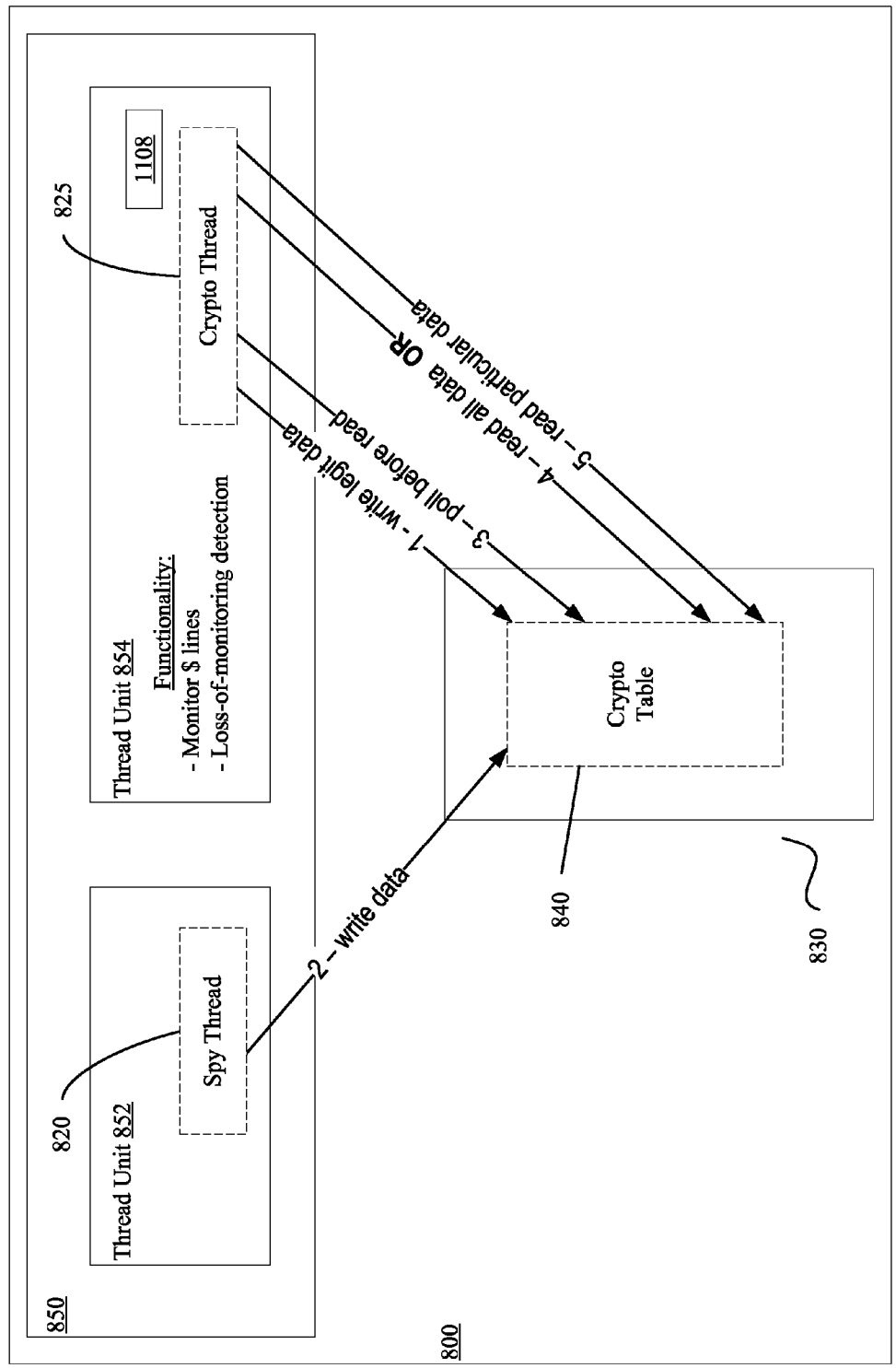
FIG. 2 is a block diagram illustrating at least one embodiment of a system and mitigation strategy to protect against spying of access patterns, and to avoid deadlocks.

FIG. 2 is a block diagram illustrating at least one embodiment of a system 800 and a mitigation strategy to protect against spying of access patterns, such as the example cache-based side channel attack illustrated in FIG. 1. The strategy involves obscuring of data access patterns based on polling of a status bit in order to monitor for foreign access to specially-designated data. Such strategy obscures memory access patterns in such a manner as to accomplish deadlock avoidance.

FIG. 2 illustrates that a spy thread 820 and crypto thread 825 may both concurrently execute on a set of thread execution resources 850. The thread execution resources 850 may be a single multi-threaded core. For such embodiment, a first thread unit 852 and a second thread unit 854 may each be logical processors (described above). Alternatively, the thread execution resources 850 may include multiple cores, having at least two cores 852, 854 to concurrently execute threads 820 and 825, respectively. For such embodiment, each thread execution unit 852, 854 is a core. Because the executable instructions of the threads 820, 825 are not necessarily hardware components of the thread units 852, 854, the thread instructions 820, 825 are denoted with broken lines in FIG. 2.

The thread execution resources 850, whether a single core or multiple cores, provide certain functionality that may be exploited to implement the mitigation strategy. For at least one embodiment, thread unit 854 includes one or more architectural instructions in its instruction set architecture (ISA) that allow a thread to set a monitor on a given data location. FIG. 2 illustrates that, at operation 1, the crypto thread 225 writes data to the cache as monitored lines. That is, the crypto thread 825 may identify memory locations or blocks of interest. These are termed "critical" memory locations because they may be critical to the security of the thread or to the secrecy of the keys involved in a decryption or encryption process. However, any set of memory locations may be identified as monitored lines by a thread for any purpose. When using this technology to protect a cryptographic algorithm from cache side channel attacks, the crypto thread 225 may, for example, indicate the crypto table 240 as critical memory locations.

The exact method of identification and monitoring of these sensitive memory locations depends on the purpose and implementation of the program of which the thread is a part, and is beyond the scope of this disclosure. For at least one embodiment, the addresses of the monitored lines may be maintained in a monitor table, as is described in further detail in co-pending patent application U.S. patent Ser. No. 11/165,639 (U.S. Publication No. 20060294326), entitled "Primitives to Enhance Thread-Level Speculation" (hereinafter referred to as the Primitives Application"). Other embodiments may implement the monitoring functionality via other techniques.

One other potential technique to implement the monitoring functionality, for example, is a protected cache technique as described in co-pending patent application U.S. patent Ser. No. 11/998,902, entitled "A Protected Cache Architecture And Secure Programming Paradigm To Protect Applications".

The thread unit 854 also provides an architectural scheme to generally indicate that loss of monitoring has occurred. In this context, "loss of monitoring" means that a foreign thread has written to one of the monitored locations or that a monitored location has been evicted from the cache and cannot be monitored any longer. For instance, for the sample embodiment illustrated in FIG. 2, loss of monitoring occurs if the spy thread 852 (which is a separate, "foreign", thread), writes data to any cache lines being monitored by the crypto thread 825.

FIG. 2 illustrates that the thread execution resources 850 include a transaction register, 1108. (Transaction register 1108 may exist instead of, or in addition to, the registers 1106, 1107 discussed below in connection with FIG. 7.) The ISA of the thread unit 854 that is to run the legitimate thread 825 includes an instruction to provide that a status bit is set in the transaction register 1108 in the event that any of the monitored lines is evicted (without indicating which specific one of the monitored lines has been written by a foreign thread). Again, implementation details of this mechanism may vary among different embodiments. For at least one embodiment, the status bit may be one bit in a transaction register. For example, a coherency collision bit, one of the transaction failure bits in a transaction status register, is described in further detail in the Primitives Application discussed above. The coherency collision bit may be set responsive to a collision, or possible collision (conservative approximations are allowed), between an entry in a monitor table and a foreign update to memory. Other embodiments may implement the loss-of-monitoring functionality in various different manners.

Embodiments may vary regarding whether the ISA of the thread unit 852 to execute a spy thread 820 includes the loss-of-monitoring instruction. For some embodiments, the thread units 852, 854 may be homogenous or asymmetric (same ISA but differing other characteristics such as clock speed and/or cache size) and therefore may both include such functionality. Thus, although not specifically illustrated in FIG. 2, thread unit 852 may also include the transaction register 1108.

For other embodiments, the thread units 852, 854 may be heterogeneous such that thread unit 852 does not include the loss-of-monitoring functionality, while thread unit 854 does. In either case, as long as the thread unit 854 that is to execute the legitimate crypto thread 825 does include the loss-of-monitoring capability, an effective obscuration strategy may be employed, as described below, by a thread 825 that executes on thread unit 854.

At least one embodiment of the obscuration strategy that utilizes the loss-of-monitoring instruction is first discussed generally below in connection with FIG. 2. A more detailed discussion of a method for performing at least one embodiment of the strategy is then presented in connection with FIG. 3.

FIG. 2 illustrates that a spy thread 820 and crypto thread 825 may both concurrently execute on a set of thread execution resources 850. FIG. 2 illustrates that, in a first operation, crypto 825 writes its data to crypto table 840, indicating that the data should be monitored for foreign writes. However, crypto 825 does not register a handler (in contrast, see discussion of FIG. 7, below). Instead, crypto 825 uses the loss-of-monitoring architectural instruction to request that a status bit be set in the transaction register 1108 in the event that any of the monitored lines, written in operation 1, is later written by a foreign thread.

At operation 2, such a write occurs when the spy thread 820 writes its data to the crypto table 840. [Such a foreign write causes the status bit to be set in the transaction register 1108, and also causes eviction of the data previously written by crypto 825 to the monitored cache lines at the first operation].

At operation 3, the Crypto thread 825 performs a polling operation. That is, at operation 3 the Crypto thread 825 polls the status bit in the status register 1108 before reading data from the crypto table 840. For embodiments where the status bit exists as one or more bit positions within the transaction register 1108 (see, e.g., status bit 915 of FIG. 3), the transaction register may be polled with a mask in order to isolate the status bit(s) of interest. If the polling operation indicates that all monitored lines are intact, then the crypto thread 825 proceeds, at operation 5, to read the particular desired data from the crypto table 840.

However, the polling operation [operation 3] may instead indicate, based on the value of the status bit in the transaction register 1108, that a "loss of monitoring" has occurred (e.g., one of the monitored cache lines was evicted due to a foreign write). In such case, the crypto thread 825 performs an access obscuration operation, shown as operation 4 in FIG. 2. At operation 4, the crypto thread 825 reads all of the data from the crypto table 840 (or other monitored lines) in some fixed order and re-sets the monitoring. By reading all the sensitive data in a fixed order, the access patterns for data actually needed by the crypto thread 825 are obscured.

FIG. 2 illustrates that the crypto thread 825 executes either operation 4 or operation 5, depending on whether loss of monitoring has occurred. When the data needed by the crypto thread 825 has not been evicted (i.e., there was no loss of monitoring because there has been no intervening foreign update to evict the monitored cache line), the crypto thread 825 may enjoy relatively faster performance due to a "safe" cache hit. That is, in such case the crypto thread 825 performs operation 4, and only reads the data it actually needs.

While not specifically illustrated in FIG. 2, one of skill in the art will recognize that the crypto thread 825 may also utilize a counter and policy enforcement approach (along the lines of that discussed below in connection with FIGS. 4 and 7), in addition to the loss-of-monitoring obscuration strategy. That is, any time that the polling operation, illustrated as operation 3 in FIG. 2, indicates loss of monitoring, a counter may be incremented. A deadlock policy may be enforced when the counter exceeds an acceptable maximum value, on the assumption that a potential deadlock situation has been encountered.

Figure 3:
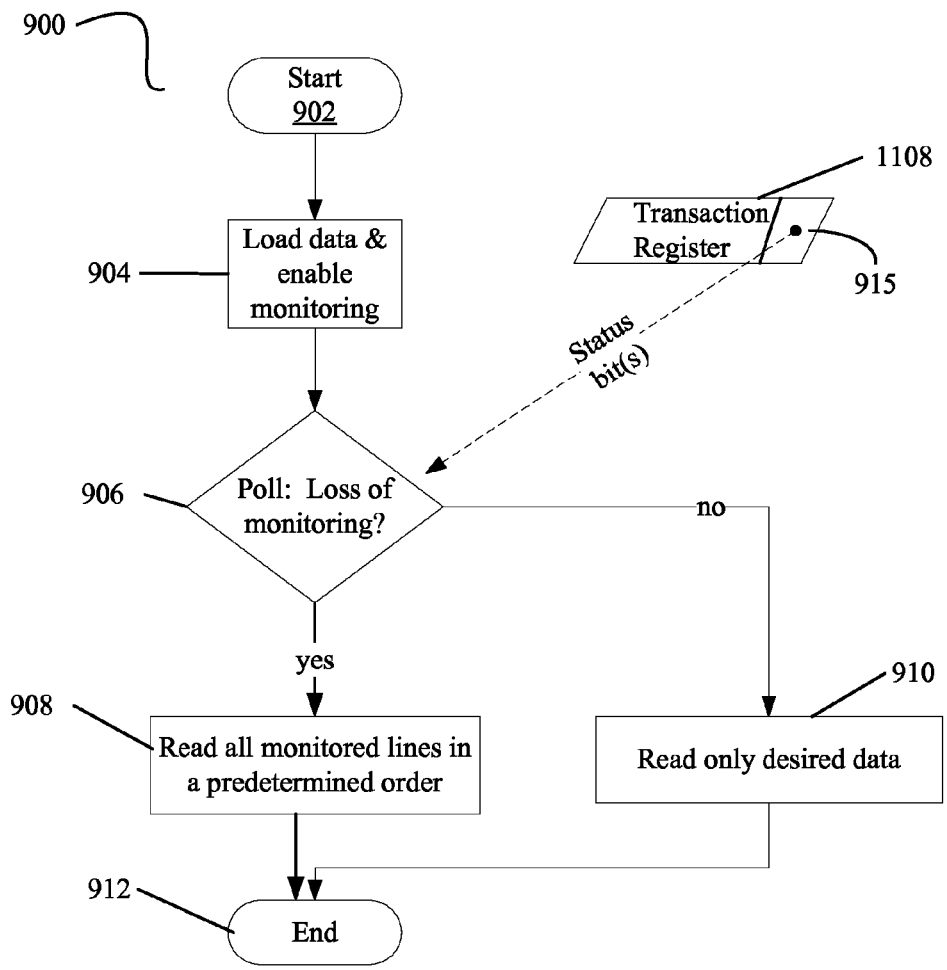
FIG. 3 is a flowchart illustrated at least one embodiment of a method for obscuring access patterns and avoiding deadlocks.

FIG. 3 is a flowchart illustrating at least one embodiment of a method for implementing the access obscuration and deadlock avoidance mechanism illustrated in FIG. 2. FIG. 3 illustrates a method 900 that begins at block 902 and proceeds to block 904. At block 904, the sensitive data is loaded and monitoring of the sensitive data is enabled. It will be understood by one of skill in the art that loading of the data at block 904 may be accomplished via a load, or write, instruction in the code of the crypto application being executed in the crypto thread 825 (see FIG. 2). Execution of the load instruction may have the result that the data is first loaded into a cache, and will later be evicted to memory or to a higher-level cache.

At block 904, monitoring is enabled for the loaded data. As is explained above in connection with FIG. 2, enabling of the monitoring feature for the sensitive data results in a status bit being set if a foreign thread writes to any of the monitored lines in the shared cache. From block 904, processing proceeds to block 906.

At block 906, the method 900 has determined that the sensitive data, which was previously loaded into the cache at block 904, now needs to be read in order to perform normal processing (such as cryptographic processing). At block 906, the status register 1 108 is polled to determine, based on the value of the status bit 915, whether any foreign writes have occurred to the monitored lines. If so, then processing proceeds to block 908. Otherwise, processing proceeds to block 910. (It should be noted that status bits(s) 915 may occupy any contiguous or non-contiguous bit locations within the transaction register 1108).

At block 908, all of the monitored lines are read. They may be read in a predetermined order, such that no access pattern is discernable. In other words, it is not intended at block 908 that the desired information is read first, and then the other data is read. Instead, the data is read at block 908 in some kind of arbitrary order. From block 908, optional counter processing (not shown) may be performed. This processing may be along the lines of that discussed below in connection with FIGS. 4 and 7. Processing then ends at block 412.

At block 910, it has been determined (based on the polling of the status bit(s) 915 at block 906) that no foreign writes or evictions have occurred to the monitored lines. Accordingly, block 910 represents "safe" cache hit processing. Thus, at block 910 only the desired sensitive data is read. That is, the method 900 reads at block 910 only that data that it requires for its current processing needs, without regard to any obscuration considerations. From block 910, processing ends at block 912.

Accordingly, the above discussion of FIG. 3 has generally described a cache access obscuration method 900, which is based on monitoring of foreign accesses (e.g., foreign reads that cause an eviction, or foreign writes) and polling of a status bit. Because the polling is synchronous with respect to the target thread 825, the method 900 is not subject to deadlocks [in contrast, see discussion below regarding FIGS. 4 and 7]. That is, even if a foreign write has occurred, forward progress of the legitimate thread is guaranteed (see blocks 908 and 910 of FIG. 3). Thus, the method 900 provides cache access obscuration along with deadlock avoidance.

Figure 4:
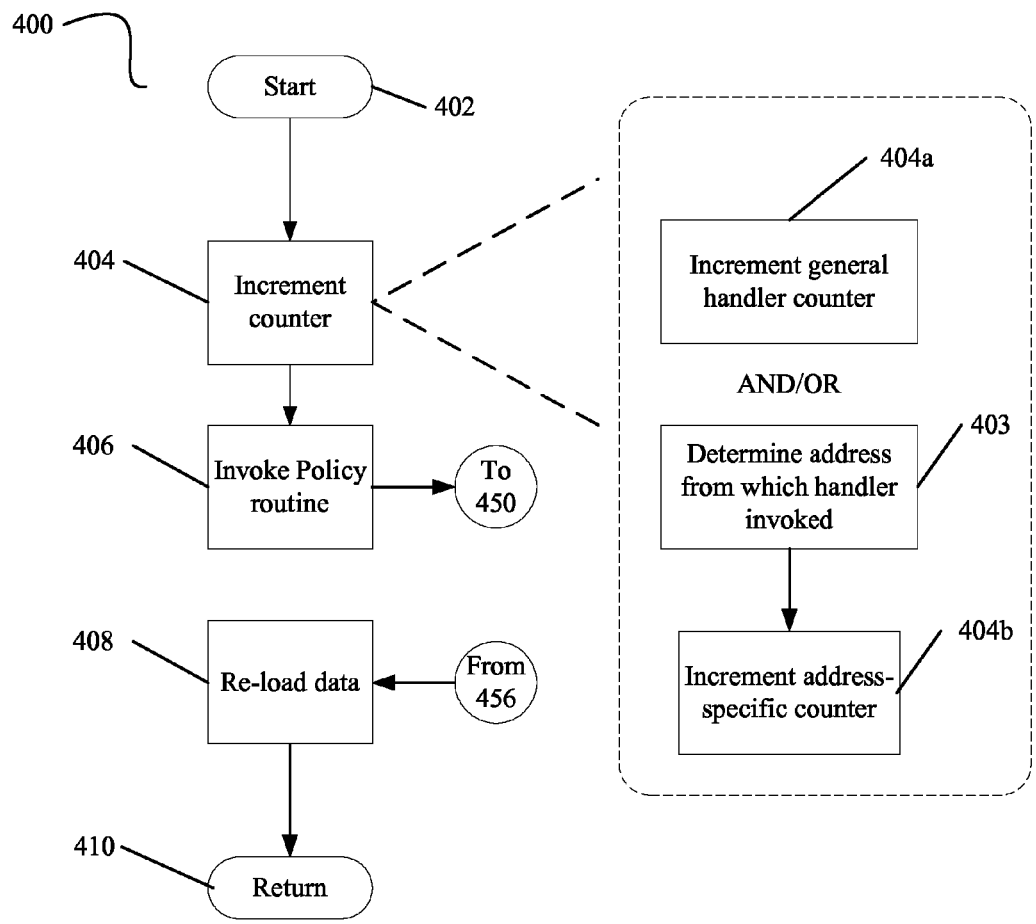
FIG. 4 is a block diagram illustrating at least one embodiment of a system and mitigation strategy to protect against spying of access patterns, and to detect deadlocks.
Figure 4:
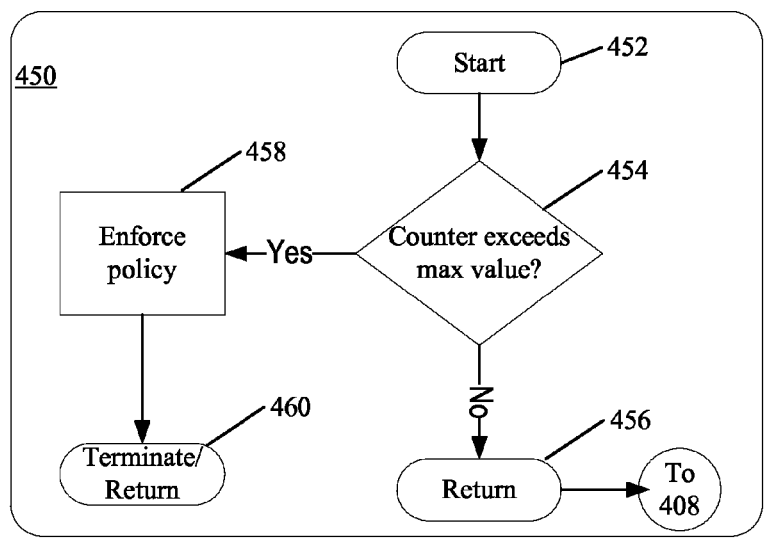
Figure 7:
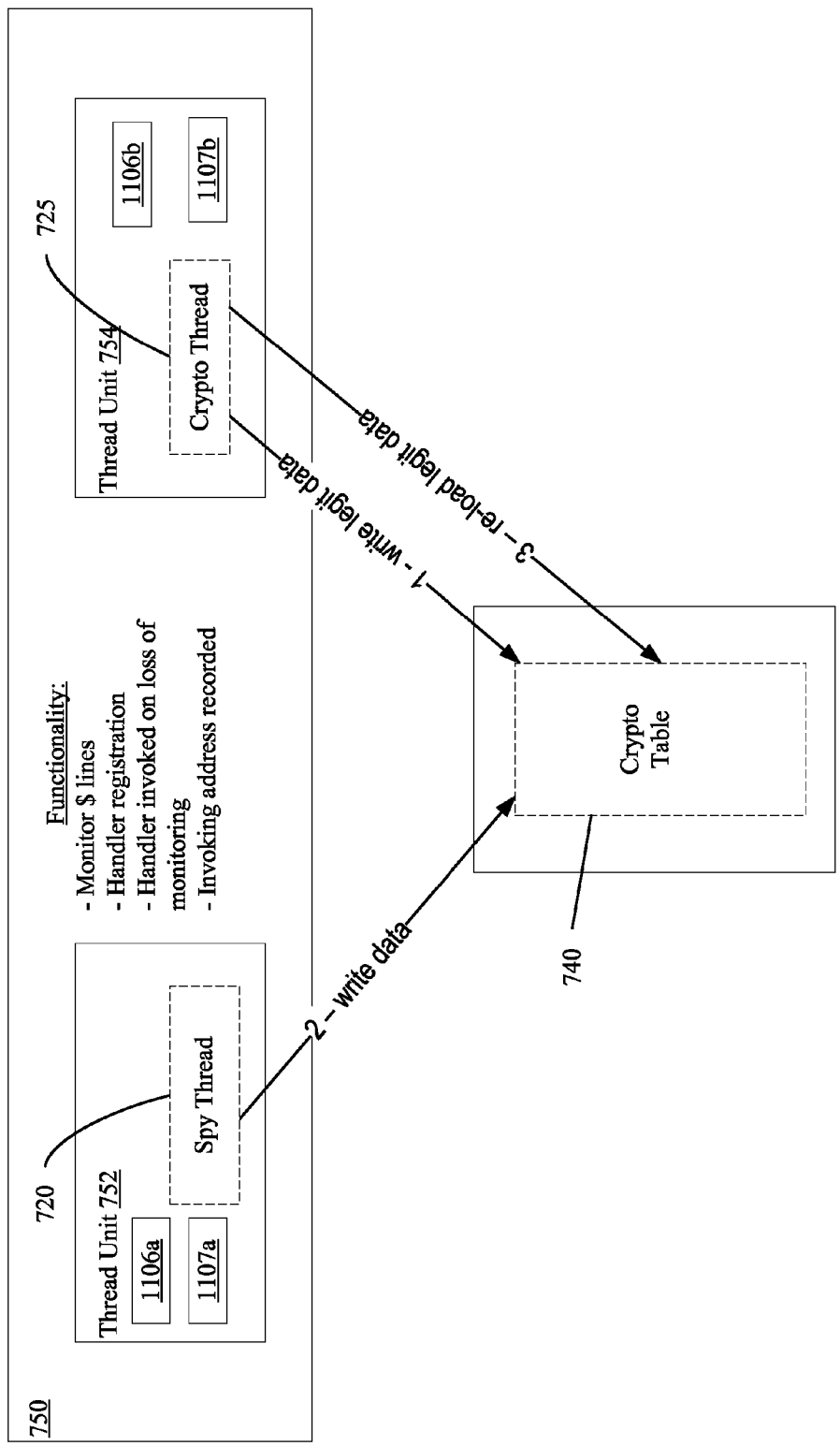
FIG. 7 is a flowchart illustrating at least one embodiment of a method for obscuring access patterns and detecting potential deadlocks.

FIG. 4 is a flowchart illustrating at least one embodiment of an alternative method for cache access obscuration. Embodiments of the method 400 detect resource starvation locks in a system that provides monitor and handler functionality for multiple threads (e.g., in embodiments of a system 700 such as illustrated in FIG. 7). FIGS. 4 and 7 are referenced together in the discussion below.

The method 400 illustrated in FIG. 4 may be performed by any (or all) threads in the system in order to obscure memory access patterns and to detect resource starvation locks (such as deadlocks or livelocks) that prevent the thread from making forward progress. In general, FIG. 4 illustrates that a handler module maintains a counter to determine the number of times that the handler module has been invoked due to eviction. The handler module may also invoke a policy function to enforce a deadlock policy.

FIG. 4 illustrates that the method 400 begins at block 402. Before execution of block 402, it is assumed that the counter value(s) have been initialized to an initial value (e.g., zero). It is also assumed that the legitimate thread has written its sensitive data in monitored lines and enabled monitoring (see, e.g., operation 1 of FIG. 7). It is also assumed that, before execution of the method 400, that a handler has been registered such that the handler will be invoked when one of the monitored lines is evicted. Such eviction may occur, for example, as a result of the foreign write illustrated at operation 2 of FIG. 7. Upon eviction, the handler is invoked, and processing of the handler begins at block 402.

From block 402, processing of the method 400 proceeds to block 404. At block 404, a counter is incremented. Various implementations may handle the counter increment function at block 404 differently. For example, one embodiment maintains a simple global counter that is incremented each time the handler is invoked. This global counter is incremented at block 404*a*.

Alternatively, a more address-specific counter may be implemented in addition to, or instead of, the global counter. Such embodiment is illustrated in blocks 403 and 404*b* of FIG. 4. For such embodiment, an architectural mechanism is used to record the address from which the handler was invoked. The counter for that specific address is incremented at block 404*b*.

The address-specific counter that is implemented at block 404*b* thus keeps count of the number of times that the handler has been invoked from a particular address in the code of the legitimate thread. If, for example, the handler is invoked multiple times from the same address of the legitimate thread, it may indicate that no forward progress is being made by the legitimate thread and that it is, indeed, suffering a deadlock or livelock condition. Implicit in the operation at block 404 is the assumption that the system on which the handler code is operating provides a mechanism by which the handler code can determine from which address the handler was invoked.

FIG. 7 illustrates at least one embodiment of a system 700 that provides handler registration, handler invocation, and address-identification functionality that may be employed to implement an embodiment of the method 400 illustrated in FIG. 4. The FIG. 7 system 700 provides, in addition to the monitoring functionality discussed above in connection with FIGS. 2 and 3, architectural mechanisms for handler registration and for writing to a register the address from which the handler was invoked.

FIG. 7 illustrates that, as in the embodiment illustrated in FIG. 3, the thread execution resources 750, whether a single core or multiple cores, provide one or more architectural instructions that allow a thread to enable monitoring when it writes lines to a cache. The functionality of the thread execution resources 750 also includes handler registration functionality and one or more architectural instructions to support invocation of a handler module if any of the monitored cache lines is evicted. In addition, the thread execution resources 750 also provide the ability to record in a register the address from which a handler has been invoked. Together, these features support implementation of memory access obscuration along with a deadlock detection mechanism.

To provide further implementation details for at least one embodiment, certain aspects of the system 700 are set forth below. Such details should not be taken to be limiting—they provide just one example embodiment for implementation of the functionalities described in the preceding paragraph.

For at least one embodiment, the thread execution resources 750 of the system 700 may include thread units 752, 754 to execute the spy thread 720 and the crypto thread 725, respectively. The thread units 752, 754 may be logical processors in a single core. Alternatively the thread units 752, 754 may be distinct physical cores. Thus, the thread units 752, 754 may be separate thread contexts implemented either on different cores or on the same core. Because the executable instructions of the threads 720, 725 are not necessarily hardware components of the thread units 752, 754, the thread instructions 720, 725 are denoted with broken lines in FIG. 7.

The thread units 752, 754 may each provide a mechanism to transfer control to handler code when certain events, such as a foreign write to specified memory locations, occur. For at least one embodiment, the mechanism may be an embodiment of user-level asynchronous signaling. Certain embodiments of such signaling mechanisms are further described in co-pending application Ser. No. 11/395,884, "A PROGRAMMABLE EVENT-DRIVEN YIELD MECHANISM" and Ser. No. 11/134,687, "A PROGRAMMABLE EVENT DRIVEN YIELD MECHANISM WHICH MAY ACTIVATE SERVICE THREADS".

A user-level asynchronous mechanism may report certain events or combinations of events ("scenarios") directly to a user-level thread running on a microprocessor without requiring the traditional intervention of the operating system. Such user-level interrupts or user-level exceptions are based on a hardware mechanism that saves sufficient information about the current state of the thread and redirects the thread to execute a pre-determined block of "handler" code to respond to the event. As part of the handler code the thread can perform any work it wishes to do and then return to the execution path it was on before the event. It may also choose to not return the execution path and instead continue to an entirely different set of tasks The instruction set architecture ("ISA") of the thread units 752, 754 of the processor system 700 may support an instruction to implement the monitor and handler functionality described above. Certain aspects of embodiments of an instruction that utilizes the hardware features of user-level asynchronous signaling are further described in co-pending application Ser. No. 11/254,286, "TECHNIQUE FOR THREAD COMMUNICATION AND SYNCHRONIZATION.", filed Oct. 19, 2005. Embodiments of the monitor instruction supported by the processor system 700 allow a thread to monitor a specified address and force a control transfer to take place (asynchronous to the current instruction flow) when another thread updates the monitored memory location.

Thus, the thread units 752, 754 may each include hardware to support asynchronous user-level signaling. Such hardware may include channel registers 1106 to hold a description of a triggering event ("scenario") and a handler code address. That is, the triggering event that triggers the handler code may be referred to as a "scenario." The triggering scenario may be an architecturally-defined set of one or more events. Alternatively, the triggering scenario may be a user-defined set of one or more events. Upon detection of the triggering scenario specified in the channel, control may be transferred to the user-level handler routine as described above.

The thread unit may save the instruction pointer of the currently-executing instruction before starting execution of handler module code at the vector_ip. A thread unit may set up a number of memory locations to be monitored. A store into any of the monitored locations by another thread unit may cause execution to be vectored to the corresponding instruction pointer for the handler code. To monitor several sensitive addresses for the same handler code, multiple monitor instructions may be executed, each specifying a different address but the same instruction pointer.

As is sated above, the thread unit saves the instruction pointer of the currently-executing instruction before control is transferred to the handler module code. The ISA of thread units 752, 754 provides for writing to a register 1107 this address from which the handler was invoked. At least one embodiment of a mechanism that may be used for this purpose is described in further detail in co-pending patent application Ser. No. 11/134,687, "A PROGRAMMABLE EVENT DRIVEN YIELD MECHANISM WHICH MAY ACTIVATE SERVICE THREADS". The address may be recorded, for instance, just before transfer of control to the handler in response to a foreign write to a monitored address. Because the control transfer may happen asynchronously with respect to the legitimate thread, the particular instruction of the legitimate thread at which the control transfer occurs cannot always be accurately predicted. Thus, the address of the instruction that was executing on the legitimate thread may be recorded so that, at the return 410 (FIG. 4), control may be returned to the appropriate location in the legitimate thread. While the embodiment illustrated in FIG. 7 illustrates that the current instruction pointer is written to a register 1107, other embodiments may also be employed for one of skill in the art.

For example, the instruction just before the current instruction pointer may be recorded, so that the current instruction may be re-executed after the return.

For another example, an alternative embodiment may record the address of the currently-executing instruction in a stack. Thus, for such embodiment the location 107 to which the address is written is an entry on a stack rather than a register. In either case, for at least one embodiment the return address is saved in memory location 1107 (which may be either in a register or on the stack).

FIG. 4 illustrates that processing proceeds from block 404 to block 406. At block 406, a policy module 450 is invoked. Of course, one of skill in the art will recognize that, instead of being invoked as a separate code routine or module, the code for the policy module may instead be in-lined into the handler code.

Generally, the policy code 450 determines whether the application may be under side channel attack by a foreign thread attempting to monitor the application's cache access activity (see, e.g., the attack scheme described in connection with FIG. 1, above). At least one embodiment of the policy code 450 makes this determination by comparing the counter maintained at block 404 with a pre-determined value.

FIG. 4 illustrates that the policy code 450 begins at block 452 and proceeds to block 454. At block 454 the policy code 450 determines whether the counter exceeds the pre-determined value. When the counter exceeds a certain pre-determined value that falls above what is expected under normal operation in terms of conflict between legitimate threads, the policy code assumes that the application may be under attack.

For embodiments that employ a general handler counter, the pre-determined value represents the maximum tolerated number of handler invocations for the aggregate block of monitored lines.

For embodiments that employ an address-specific handler, the comparison at block 454 is slightly more involved. That is, the policy code 450 determines at block 454 the address from which the handler was invoked (by, e.g., evaluating the contents of structure 1107 illustrated in FIG. 7). The policy 450 then determines at block 454 whether an address-specific maximum has been exceeded for that particular address. If the counter has been exceeded, it indicates that an eviction-reload cycle may have occurred repeatedly at the same address. This provides a clear indication that a deadlock situation has emerged (possibly due to malicious attack).

If the counter is not determined to exceed the predetermined value at block 454, then processing proceeds to block 456, which returns control to block 408 of the method 400.

If, on the other hand, it is determined at block 454 that the counter exceeds the maximum tolerated number of handler invocations, then processing proceeds from block 454 to block 458. In such case, it is assumed that, due to the high number of handler invocations (e.g., high number of evictions for the monitored line(s)), that a deadlock/livelock situation is likely to ensue or has already begun to exist. At block 458, a deadlock policy is enforced. The particular policy enforced at block 458 may vary based on system, design, and functionality considerations.

For one example embodiment, the application code is aborted at block 458. For such example embodiment, processing then proceeds to block 460, which does not return to the handler code but instead simply terminates all processing for the legitimate thread.

For one other example embodiment, the policy enforcement block 458 requests arbitration from the operating system (OS) in order to alleviate the apparent deadlock. Processing may then return to block 408 from block 460, in the optimistic hope that the potential deadlock will be alleviated by the OS arbitration.

For one other example embodiment, the policy enforcement block 458 may provide a notification to the user. Such notification may be a simple push of information to the user, indicating that a potential deadlock has been detected. Processing for such embodiment may then proceed to block 460, which may either terminate processing of the application or may optimistically return control to block 408.

For at least one embodiment, user notification generated at block 458 may additionally request action of the user in order to ameliorate the potential deadlock condition. For example, the policy enforcement block 458 may generate a message requesting that the user remove the apparently malicious code. Processing for such embodiment may then proceed to block 460, which optimistically returns control to block 408.

At block 408, the method 400 re-loads the evicted data (see, also, operation 3 of FIG. 7). For some embodiments, this may be accomplished by re-loading all of the monitored lines, instead of re-loading just the specific evicted line. Processing then proceeds to block 410.

At block 410, the method 400 returns control to the application. Control may return, at block 410, to next address of the application that was to be executed at the time the handler was invoked. That is, control returns to the instruction of the target thread at the instruction pointer recorded in structure 1107. Alternatively, processing may return at block 410 to a pre-assigned address.

Embodiments of the mechanism, system, and method illustrated in FIGS. 4 and 7 may be employed to avoid a resource starvation situation (livelock or deadlock) that could otherwise readily occur to prevent either thread from making forward progress. That is, if both the spy thread 420 and the crypto thread 425 each apply a monitor and handler strategy described above (albeit for different end goals), but without the counter and deadlock policy, then the two threads 720, 725 may ping-pong between evictions and reloads, with neither thread able to make forward progress.

One of skill in the art will also recognize that the potential for a resource starvation condition between two threads exists for a situation where both threads implement a monitor and handler strategy, without the counter and deadlock policy described above, even when both threads are running legitimate applications. Assume, for example, that the first thread 720 runs a legitimate cryptography routine rather than a spy routine. If both threads 720, 725 implement the monitor and handler strategy to prevent against side channel attacks, and both threads share the crypto table 740, then they could also devolve into a ping-pong eviction-and-reload cycle with neither thread able to make forward progress. Utilization of a counter and deadlock policy, as illustrated in FIG. 4, alleviates this concern.

Figure 5:
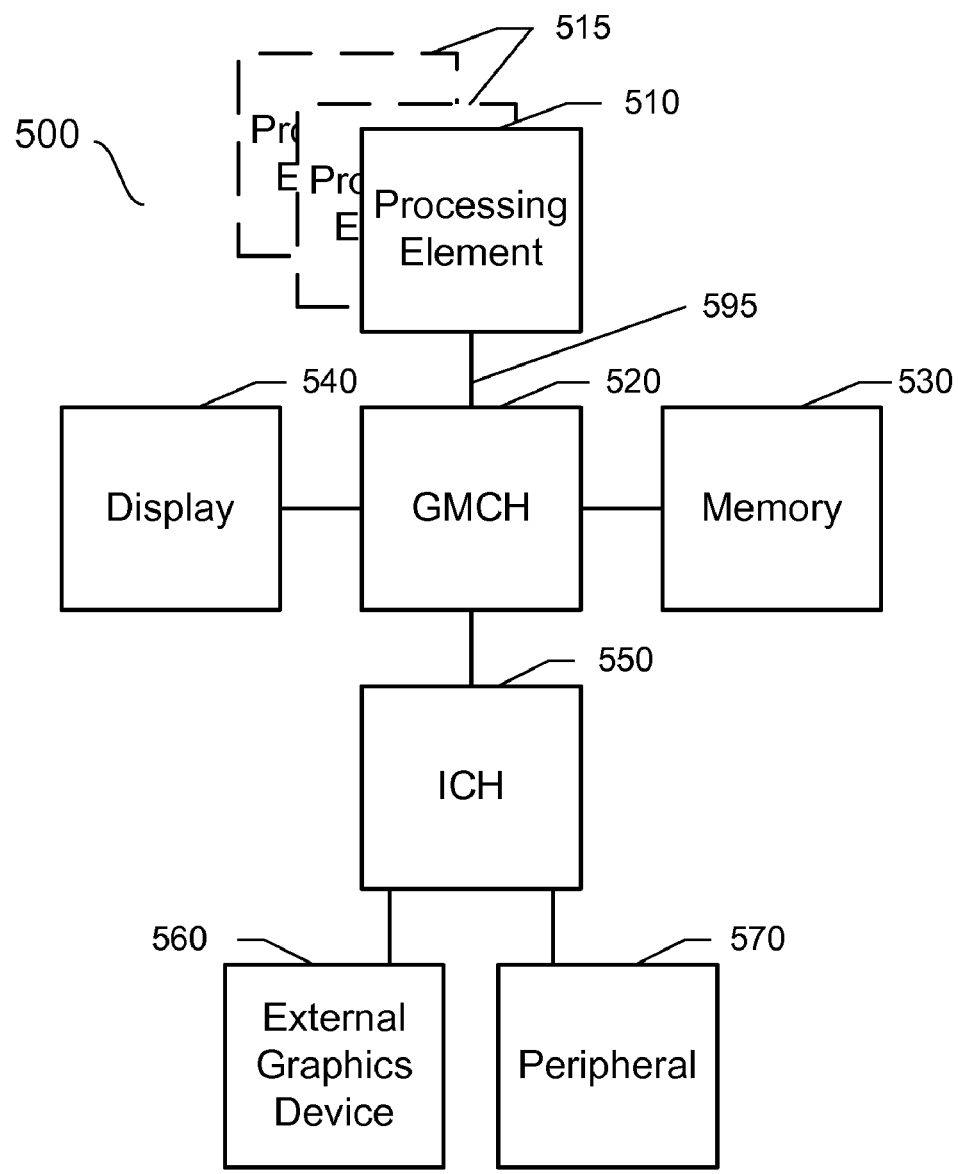
FIG. 5 is a block diagram of a system in accordance with at least one embodiment of the present invention.

Referring now to FIG. 5, shown is a block diagram of a system in accordance with one embodiment of the present invention. As shown in FIG. 5, the system 500 may include one or more processing elements 510, 515, which are coupled to graphics memory controller hub (GMCH) 520. The optional nature of additional processing elements 515 is denoted in FIG. 5 with broken lines.

FIG. 5 illustrates that the GMCH 520 may be coupled to a memory 530 that may be, for example, a dynamic random access memory (DRAM). The GMCH 520 may be a chipset, or a portion of a chipset. The GMCH 520 may communicate with the processor(s) 510, 515 and control interaction between the processor(s) 510, 515 and memory 530. The GMCH 520 may also act as an accelerated bus interface between the processor(s) 510, 515 and other elements of the system 500. For at least one embodiment, the GMCH 520 communicates with the processor(s) 510, 515 via a multi-drop bus, such as a frontside bus (FSB) 595.

Furthermore, GMCH 520 is coupled to a display 540 (such as a flat panel display). GMCH 520 may include an integrated graphics accelerator. GMCH 520 is further coupled to an input/output (I/O) controller hub (ICH) 550, which may be used to couple various peripheral devices to system 500. Shown for example in the embodiment of FIG. 5 is an external graphics device 560, which may be a discrete graphics device coupled to ICH 550, along with another peripheral device 570.

Alternatively, additional or different processing elements may also be present in the system 500. For example, additional processing element(s) 515 may include additional processors(s) that are the same as processor 510, additional processor(s) that are heterogeneous or asymmetric to processor 510, accelerators (such as, e.g., graphics accelerators or digital signal processing (DSP) units), field programmable gate arrays, or any other processing element. There can be a variety of differences between the physical resources 510, 515 in terms of a spectrum of metrics of merit including architectural, microarchitectural, thermal, power consumption characteristics, and the like. These differences may effectively manifest themselves as asymmetry and heterogeneity amongst the processing elements 510, 515. For at least one embodiment, the various processing elements 510, 515 may reside in the same die package.

Figure 6:
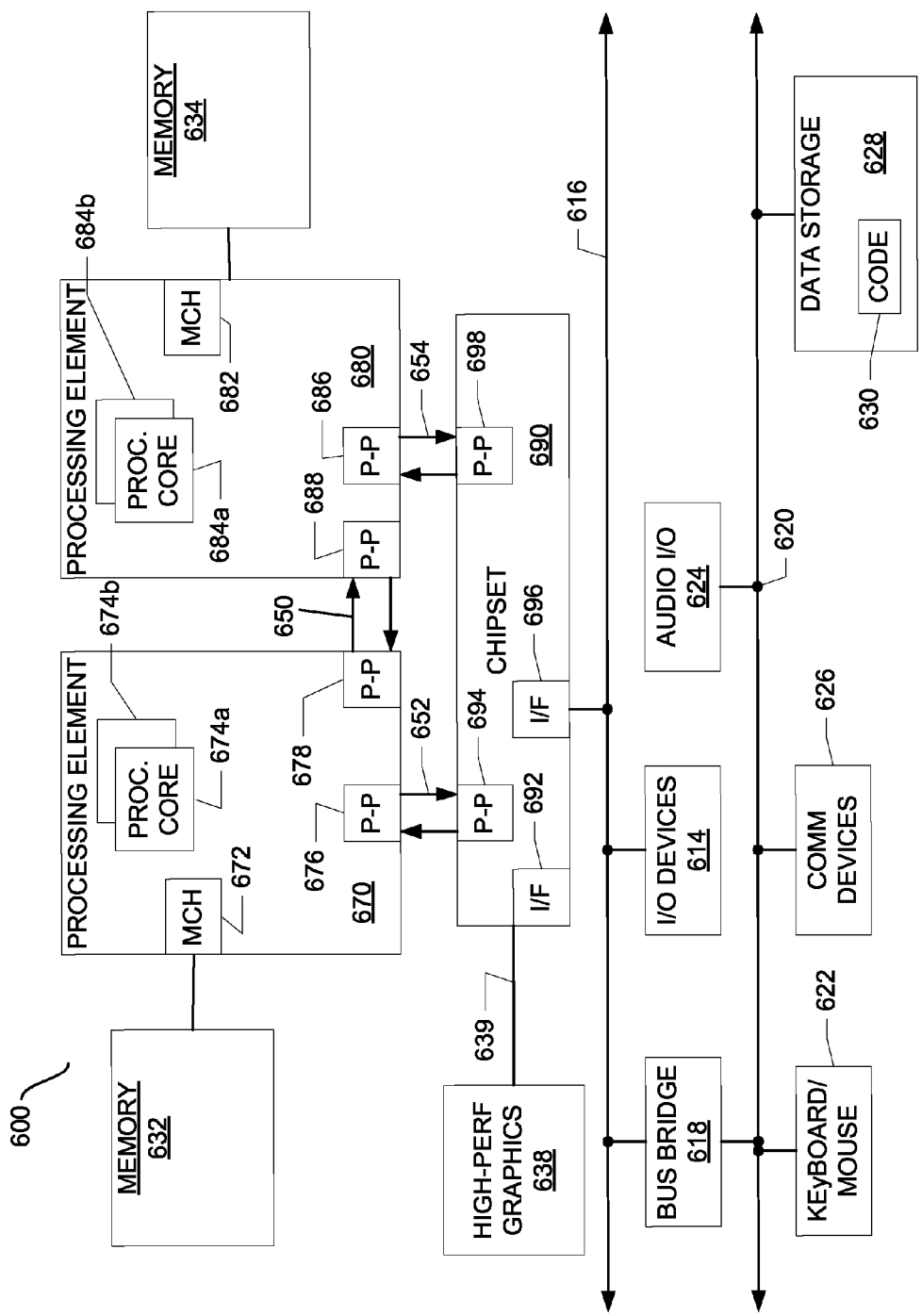
FIG. 6 is a block diagram of a system in accordance with at least one other embodiment of the present invention.

Embodiments may be implemented in many different system types. Referring now to FIG. 6, shown is a block diagram of a system in accordance with another embodiment of the present invention. As shown in FIG. 6, multiprocessor system 600 is a point-to-point interconnect system, and includes a first processing element 670 and a second processing element 680 coupled via a point-to-point interconnect 650. As shown in FIG. 6, each of processing elements 670 and 680 may be multicore processors, including first and second processor cores (i.e., processor cores 674a and 674b and processor cores 684a and 684b). Alternatively, each processing element 670, 680 may be a single core that supports multiple thread contexts.

Alternatively, one or more of processing elements 670, 680 may be an element other than a processor, such as an accelerator or a field programmable gate array.

While shown with only two processing elements 670, 680, it is to be understood that the scope of the present invention is not so limited. In other embodiments, one or more additional processing elements may be present in a given processor.

First processing element 670 may further include a memory controller hub (MCH) 672 and point-to-point (P-P) interfaces 676 and 678. Similarly, second processing element 680 may include a MCH 682 and P-P interfaces 686 and 688. As shown in FIG. 6, MCH's 672 and 682 couple the processors to respective memories, namely a memory 632 and a memory 634, which may be portions of main memory locally attached to the respective processors.

First processing element 670 and second processing element 680 may be coupled to a chipset 690 via P-P interconnects 652 and 654, respectively. As shown in FIG. 6, chipset 690 includes P-P interfaces 694 and 698. Furthermore, chipset 690 includes an interface 692 to couple chipset 690 with a high performance graphics engine 638. In one embodiment, bus 639 may be used to couple graphics engine 638 to chipset 690. Alternately, a point-to-point interconnect 639 may couple these components.

In turn, chipset 690 may be coupled to a first bus 616 via an interface 696. In one embodiment, first bus 616 may be a Peripheral Component Interconnect (PCI) bus, or a bus such as a PCI Express bus or another third generation I/O interconnect bus, although the scope of the present invention is not so limited.

As shown in FIG. 6, various I/O devices 614 may be coupled to first bus 616, along with a bus bridge 618 which couples first bus 616 to a second bus 620. In one embodiment, second bus 620 may be a low pin count (LPC) bus. Various devices may be coupled to second bus 620 including, for example, a keyboard/mouse 622, communication devices 626 and a data storage unit 628 such as a disk drive or other mass storage device which may include code 630, in one embodiment. The code 630 may include instructions for performing embodiments of one or more of the methods described above. Further, an audio I/O 624 may be coupled to second bus 620. Note that other architectures are possible. For example, instead of the point-to-point architecture of FIG. 6, a system may implement a multi-drop bus or another such architecture.

Embodiments of the mechanisms disclosed herein may be implemented in hardware, software, firmware, or a combination of such implementation approaches. Embodiments of the invention may be implemented as computer programs executing on programmable systems comprising at least one processor, a data storage system (including volatile and non-volatile memory and/or storage elements), at least one input device, and at least one output device.

Program code, such as code 630 illustrated in FIG. 6, may be applied to input data to perform the functions described herein and generate output information. For example, program code 630 may include code for a legitimate crypto thread, such as those 825, 725 illustrated in FIGS. 2 and 7, respectively. For at least some such embodiments, the program code 630 may include one or more instructions to monitor sensitive data. Program code 630 may include instructions to register a handler, as well as the handler code itself. Program code 630 may include one or more instructions to record a return address in a register or on a stack when a foreign write is detected. Program code may 630 may include, for at least some embodiments, code to enforce a deadlock policy such as that 450 discussed above in connection with FIG. 4. Program code 630 may include one or more instructions to poll an architectural status register to detect loss of monitoring. Program code 630 may include, for at least some embodiments, one or more instructions to perform embodiments of the methods illustrated in FIGS. 3 and 4, respectively.

Accordingly, alternative embodiments of the invention also include machine-accessible media containing instructions for performing the operations of the invention or containing design data, such as HDL, which defines structures, circuits, apparatuses, processors and/or system features described herein. Such embodiments may also be referred to as program products.

Such machine-accessible storage media may include, without limitation, tangible arrangements of particles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The programs may be implemented in a high level procedural or object oriented programming language to communicate with a processing system. The programs may also be implemented in assembly or machine language, if desired. In fact, the mechanisms described herein are not limited in scope to any particular programming language. In any case, the language may be a compiled or interpreted language.

Presented herein are embodiments of methods and systems for cache access obscuration with deadlock avoidance, as well as embodiment of methods and systems for cache access obscuration with deadlock detection. While particular embodiments of the present invention have been shown and described, it will be obvious to those skilled in the art that changes and modifications can be made without departing from the scope of the appended claims.

Accordingly, one of skill in the art will recognize that changes and modifications can be made without departing from the present invention in its broader aspects. The appended claims are to encompass within their scope all such changes and modifications that fall within the true scope of the present invention.

What is claimed is:

1. A computer-implemented method, comprising:
executing, via a first thread, one or more instructions to register a handler module to be invoked in response to an access, via a second thread, to one or more specified memory locations;
transferring control from the first thread to the handler module in response to data being evicted, via the access by the second thread, from one or more of the specified memory locations;
recording, in a register, an address of a second instruction of the first thread that was executing at the time of control transfer to the handler module;
incrementing an address-specific counter in response to each control transfer to the handler module such that the address-specific counter represents a number of times the handler module was invoked from the recorded address while the second instruction was executing; and
executing a deadlock policy responsive to the address-specific counter exceeding a maximum acceptable value, the deadlock policy affecting the first thread in response to execution.

2. The method of claim 1, wherein:
the address-specific counter is one of a plurality of address-specific counters, each address-specific counter being associated with a different instruction of the first thread.

3. The method of claim 1, wherein:
executing the deadlock policy further comprises aborting execution of the first thread.

4. The method of claim 1, wherein:
executing the deadlock policy further comprises presenting a message to a user.

5. The method of claim 1, further comprising:
returning control from the handler to the first thread.

6. The method of claim 5, further comprising:
loading data to the specified one or more memory locations before returning control to the first thread.

7. An article comprising:
a non-transitory storage medium having a plurality of machine accessible instructions; wherein, when the instructions are executed by a processor, the instructions provide for: executing, via a first thread, one or more instructions to register a handler module to be invoked in response to an access, via a second thread, to one or more specified memory locations;
transferring control from the first thread to the handler module in response to data being evicted, via the access by the second thread, from one or more of the specified memory locations;
recording an address of an instruction of the first thread that was executing at the time of control transfer to the handler module;
incrementing an address-specific counter in response to each control transfer to the handler module such that the address-specific counter represents a number of times the handler module was invoked from the recorded address while the associated instruction of the first thread was executing; and
executing a deadlock policy responsive to the address-specific counter exceeding a maximum acceptable value, the deadlock policy affecting the first thread in response to execution.

8. The article of claim 7, wherein:
the address-specific counter is one of a plurality of address-specific counters, each address-specific counter being associated with a different instruction of the first thread; and
said instructions further provide that the address-specific counter is incremented responsive to determining that the handler module has been invoked from the instruction of the first thread.

9. The article of claim 7, wherein the instructions that provide for executing the deadlock policy further provide for, when executed by the processor:
comprises aborting execution of the first thread.

10. The article of claim 7, wherein the instructions that provide for executing the deadlock policy further provide for, when executed by the processor:
presenting a message to a user.

11. The article of claim 7, wherein the instructions further provide for, when executed by a processor:
returning control from the handler to the first thread.

12. The article of claim 11, wherein the instructions that provide for returning control from the handler to the first thread further comprise, when executed by the processor:
loading data to the specified one or more memory locations before returning control to the first thread.

13. A system, comprising:
a memory resource coupled to a first thread unit and a second thread unit;
the first thread unit including in its instruction set architecture an instruction to monitor a specified location of the memory resource;
wherein the instruction set architecture of the first thread unit further includes an instruction to register a handler module to be invoked in response to modification of data at said specified location by the second thread unit; and
wherein the memory resource is further to store code that includes instructions to (i) increment an address-specific counter each time the handler module is invoked such that the address-specific counter represents a number of times control was transferred from the first thread unit to the handler module while the first thread unit was executing an instruction at an address indicated by the address-specific counter and (ii) execute a deadlock policy, in response to the address-specific counter having a predetermined relationship with a maximum value, the deadlock policy affecting the first thread unit in response to execution.

* * * * *